US009787574B2

(12) United States Patent
Iwauchi et al.

(10) Patent No.: US 9,787,574 B2
(45) Date of Patent: Oct. 10, 2017

(54) COMMUNICATION APPARATUS, CONTROL METHOD THEREFOR, AND COMPUTER-READABLE STORAGE MEDIUM

(71) Applicant: CANON KABUSHIKI KAISHA, Tokyo (JP)

(72) Inventors: Nobuyuki Iwauchi, Kawasaki (JP); Takashi Moriya, Yokohama (JP); Shigeto Sakai, Tokyo (JP); Shuji Inoue, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/257,108

(22) Filed: Apr. 21, 2014

(65) Prior Publication Data
US 2014/0320908 A1  Oct. 30, 2014

(30) Foreign Application Priority Data

Apr. 26, 2013 (JP) .................................. 2013-094641
Feb. 27, 2014 (JP) .................................. 2014-037321

(51) Int. Cl.
*H04L 12/707* (2013.01)
*G06F 3/12* (2006.01)

(52) U.S. Cl.
CPC .............. *H04L 45/24* (2013.01); *H04L 45/22* (2013.01); *G06F 3/1236* (2013.01)

(58) Field of Classification Search
CPC ..... G06F 3/1236; G06F 3/1292; H04L 45/24; H04L 45/22
(Continued)

(56) References Cited

U.S. PATENT DOCUMENTS 8,259,332 B2   9/2012 Shimazaki .................. 358/1.15
8,553,252 B2  10/2013 Shimazaki .................. 358/1.15
(Continued)

FOREIGN PATENT DOCUMENTS

JP   2005303821 A   10/2005
JP   2011-124980 A   6/2011
(Continued)

OTHER PUBLICATIONS

U.S. Appl. No. 14/257,139—Final Office Action dated Aug. 18, 2015.
(Continued)

*Primary Examiner* — Houshang Safaipour
*Assistant Examiner* — Bharatkumar S Shah
(74) *Attorney, Agent, or Firm* — Fitzpatrick, Cella, Harper & Scinto

(57) ABSTRACT

The following processing is executed by a communication apparatus capable of performing wireless communication in a first communication mode in which communication is performed via an access point and a second communication mode in which communication is performed with a communication partner apparatus in a peer-to-peer mode. If communicating with the communication partner apparatus in the second communication mode, it is determined whether to concurrently execute operations in the first communication mode and the second communication mode. If it is determined to concurrently execute the operations in the first communication mode and the second communication mode, it is controlled to operate as a service providing source which provides a service in the second communication mode.

21 Claims, 14 Drawing Sheets

(58) Field of Classification Search
USPC .......................................................... 358/1.15
See application file for complete search history.

(56) References Cited

U.S. PATENT DOCUMENTS

| | | | |
|---|---|---|---|
| 9,137,751 B2 | 9/2015 | Huang | H04W 52/0216 |
| 2008/0194201 A1 | 8/2008 | Sinivaara et al. | |
| 2008/0225806 A1 | 9/2008 | Arian et al. | 370/338 |
| 2010/0033760 A1* | 2/2010 | Kimura | H04N 1/32037 |
| | | | 358/1.15 |
| 2010/0302958 A1 | 12/2010 | Wietfeldt et al. | 370/252 |
| 2011/0082940 A1* | 4/2011 | Montemurro | H04W 76/023 |
| | | | 709/227 |
| 2011/0225305 A1 | 9/2011 | Vedantham et al. | 709/227 |
| 2011/0231922 A1 | 9/2011 | Azuma | 726/9 |
| 2012/0084364 A1* | 4/2012 | Sivavakeesar | 709/205 |
| 2012/0092714 A1 | 4/2012 | Suzuki | 358/1.15 |
| 2012/0102106 A1 | 4/2012 | Chen | 709/204 |
| 2012/0147420 A1 | 6/2012 | Nishimi | 358/1.15 |
| 2013/0044739 A1* | 2/2013 | Huang | H04W 52/0216 |
| | | | 370/338 |
| 2013/0148149 A1* | 6/2013 | Park | G06F 3/1296 |
| | | | 358/1.13 |
| 2013/0166759 A1 | 6/2013 | Rajamani et al. | 709/227 |
| 2014/0002862 A1 | 1/2014 | Shimazaki | 358/1.15 |
| 2014/0078928 A1* | 3/2014 | Verma | H04W 84/20 |
| | | | 370/254 |
| 2014/0237132 A1 | 8/2014 | Yamaguchi | 709/228 |
| 2014/0349577 A1* | 11/2014 | Matsuda | H04W 4/008 |
| | | | 455/41.2 |

FOREIGN PATENT DOCUMENTS

| | | |
|---|---|---|
| JP | 2011-199408 | 10/2011 |
| JP | 2011-249960 A | 12/2011 |
| JP | 2011-250158 | 12/2011 |
| JP | 2012-019487 | 1/2012 |
| JP | 2012-529229 | 11/2012 |

OTHER PUBLICATIONS

U.S. Appl. No. 14/257,139—Non-Final Office Action dated Sep. 14, 2016.
U.S. Appl. No. 14/257,139; Office Action dated Jun. 1, 2016.
Office Action issued in Japanese Application No. 2013094644, dated Mar. 3, 2017.
Counterpart office action, Japanese Application No. 2014037321, dated Dec. 22, 2016.
U.S. Appl. No. 14/244,606, filed Apr. 3, 2014.
U.S. Appl. No. 14/257,178, filed Apr. 21, 2014.
Japanese Office Action issued in corresponding Japanese Patent Application No. 2014-037321 dated May 19, 2017.

* cited by examiner

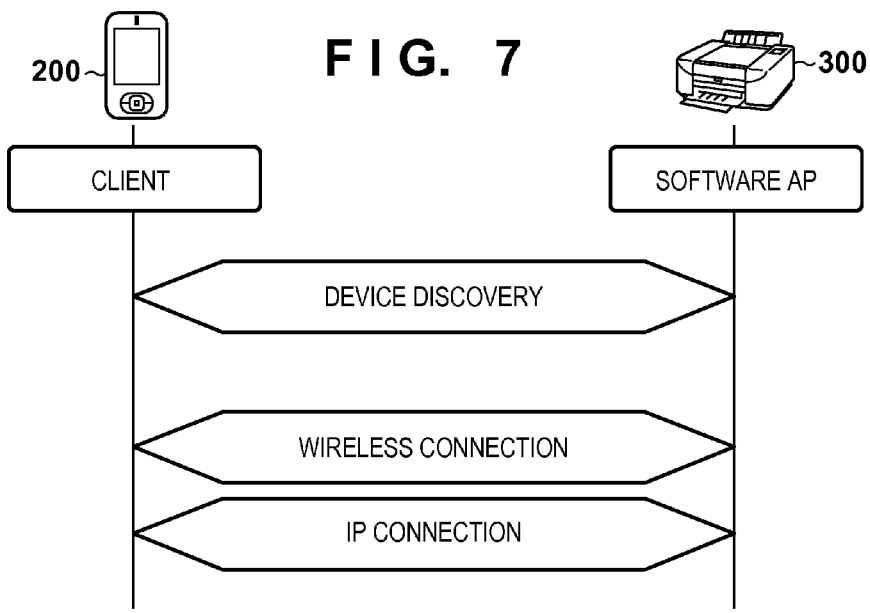
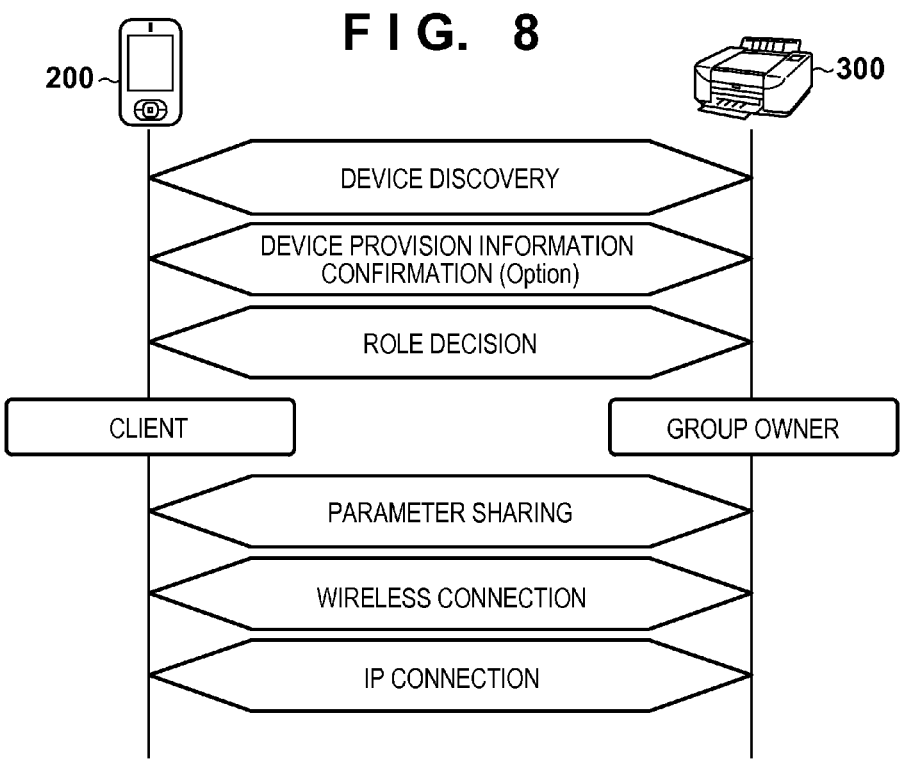

COMMUNICATION APPARATUS, CONTROL METHOD THEREFOR, AND COMPUTER-READABLE STORAGE MEDIUM

BACKGROUND OF THE INVENTION

Field of the Invention

The present invention relates to a communication apparatus, a control method therefor, and a computer-readable storage medium.

Description of the Related Art

A wireless communication standard called Wi-Fi Direct® is known. Wi-Fi Direct is one of wireless communication standards (Wi-Fi) certified by Wi-Fi alliance, which enables a terminal to directly connect to another terminal to transmit/receive data without an access point used in a normal Wi-Fi connection method.

Wi-Fi Direct implements direct connection between electronic devices by defining a protocol for automatically deciding whether each electronic device operates as a wireless LAN access point or wireless LAN station, and eliminating the need for a dedicated device as an access point. As a method of directly connecting terminals by a wireless LAN, there is an "ad hoc mode" in addition to Wi-Fi Direct. The difference between Wi-Fi Direct and the ad hoc mode is as follows. That is, Wi-Fi Direct is a method in which any one of terminals implements the function of a wireless LAN access point (host device), and the ad hoc mode is a connection method which uses no access point.

Japanese Patent Laid-Open No. 2011-124980 discloses an arrangement in which a host device notifies client devices belonging to the same group as that of the host device of frequencies used by other groups and a frequency change timing, changes a frequency used simultaneously with the client devices, and performs connection processing with other groups using the changed frequency.

When causing two or more interfaces to simultaneously (parallelly or concurrently) perform communication operations using one wireless communication unit (wireless chip), assigning different channels for the respective interfaces results in complicated processing. For example, the system configuration of the overall apparatus including hardware and a software arrangement for performing time division processing for communication operations executed in different channels becomes complicated. Therefore, when a communication apparatus including one wireless communication unit parallelly executes communication processes (simultaneous communication), it is desirable to assign a common channel for the respective communication operations.

If one communication apparatus operates in a general infrastructure mode (a mode in which communication is performed via an access point) in a wireless LAN and a P2P mode like Wi-Fi Direct simultaneously using one wireless chip, the following problem arises. For example, when a communication apparatus operates as a client (STA) in the infrastructure mode, an access point side has the right to decide to assign a unique channel to the communication apparatus. On the other hand, when a communication apparatus operates as a group owner (a side of providing an access point function) in the P2P mode, it has the right to decide to assign a channel.

Assume that a communication apparatus performs communication operations in the infrastructure mode and the P2P mode simultaneously. In this case, if the communication apparatus operates as a client in the P2P mode prior to communication in the infrastructure mode, a partner apparatus which operates as an access point in the infrastructure mode or as a group owner may be assigned a channel different from that used in the P2P mode. Therefore, a communication apparatus which cannot parallelly perform communication operations in a plurality of channels cannot simultaneously perform communication operations.

Furthermore, if one communication apparatus operates only in the P2P mode in Wi-Fi Direct with a partner apparatus instead of simultaneously performing communication operations in a plurality of communication modes, one of communication apparatuses needs to become a client and the other needs to become a group owner in a role decision stage before wireless connection.

In either case, that is, if a communication apparatus simultaneously performs operations or if a communication apparatus operates in the P2P mode in Wi-Fi Direct, there is a role decision phase before wireless connection in Wi-Fi Direct. In this phase, a communication apparatus to operate as a group owner is decided based on an Owner Intent. If, however, respective communication apparatuses declare the equal Owner Intents for deciding a group owner, role decision cannot be made, thereby disabling wireless connection.

SUMMARY OF THE INVENTION

The present invention provides a communication technique capable of normally performing communication at the time of wireless communication in the peer-to-peer mode.

To achieve the above object, a communication apparatus according to the present invention has the following arrangement. That is, there is provided a communication apparatus capable of performing wireless communication in a first communication mode in which communication is performed via an access point and a second communication mode in which communication is performed with a communication partner apparatus in a peer-to-peer mode, comprising: a determination unit configured to determine whether to concurrently execute operations in the first communication mode and the second communication mode, if communicating with the communication partner apparatus in the second communication mode; and a control unit configured to control, if the determination unit determines to concurrently execute the operations in the first communication mode and the second communication mode, to operate as a service providing source which provides a service in the second communication mode.

According to the present invention, it is possible to normally perform communication at the time of wireless communication in the peer-to-peer mode.

Further features of the present invention will become apparent from the following description of exemplary embodiments with reference to the attached drawings.

BRIEF DESCRIPTION OF THE DRAWINGS

FIG. 7 is a sequence chart showing a wireless connection sequence in mode A (a software AP mode);

FIG. 8 is a sequence chart showing a wireless connection sequence in mode B (a WFD mode);

DESCRIPTION OF THE EMBODIMENTS

Embodiments of the present invention will be exemplarily described in detail below with reference to the accompanying drawings. Note that the relative arrangement of components, display screens, and the like set forth in the embodiment do not intend to limit the scope of the invention to them, unless otherwise specified.

<System Configuration>

A system configuration for implementing each embodiment to be described below will be explained first with reference to FIGS. 1 to 6.

Figure 1:
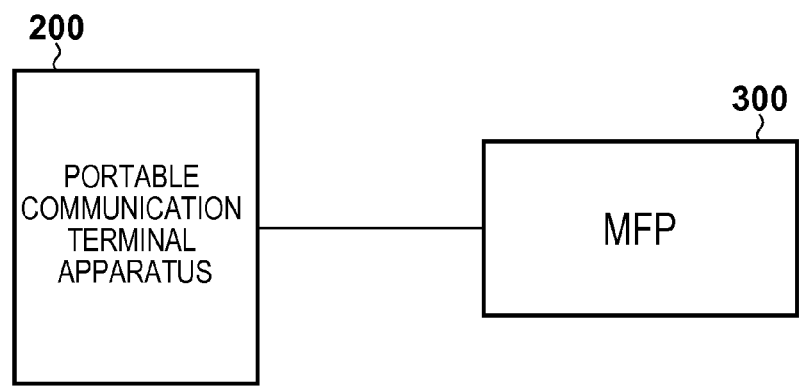
FIG. 1 is a view showing an example of the configuration of a wireless communication system.

FIG. 1 is a view showing the arrangement of a system including a portable communication terminal apparatus and a printing apparatus (MFP).

A portable communication terminal apparatus 200 is an apparatus including a wireless LAN (WLAN) communication unit and a short distance wireless communication unit. Note that short distance wireless communication indicates wireless communication whose communication range is a relatively narrow predetermined range (for example, 1 m to several cm or less), which is represented by NFC. The portable communication terminal apparatus 200 may be a personal information terminal such as a PDA (Personal Digital Assistant), a mobile phone, a digital camera, or the like. A printing apparatus (MFP) 300 need only be wirelessly communicable with the portable communication terminal apparatus 200, and may additionally have a reading function (scanner), a FAX function, and a telephone function. In this embodiment, an MFP (Multi Function Printer) having a reading function and a printing function will be exemplified. Each of the portable communication terminal apparatus 200 and the MFP 300 has a short distance wireless communication unit using NFC. Even if no power is supplied to the portable communication terminal apparatus 200, it is possible to perform short distance wireless communication by moving the portable communication terminal apparatus 200 closer to the MFP 300 within a predetermined distance where NFC communication is possible. The MFP 300 can wirelessly communicate with a terminal on a network (network in which communication can be performed using TCP/IP) using a WLAN communication unit. One or both of the portable communication terminal apparatus 200 and the MFP 300 may perform wireless communication using only the WLAN communication unit without the short distance wireless communication unit.

Figure 2:
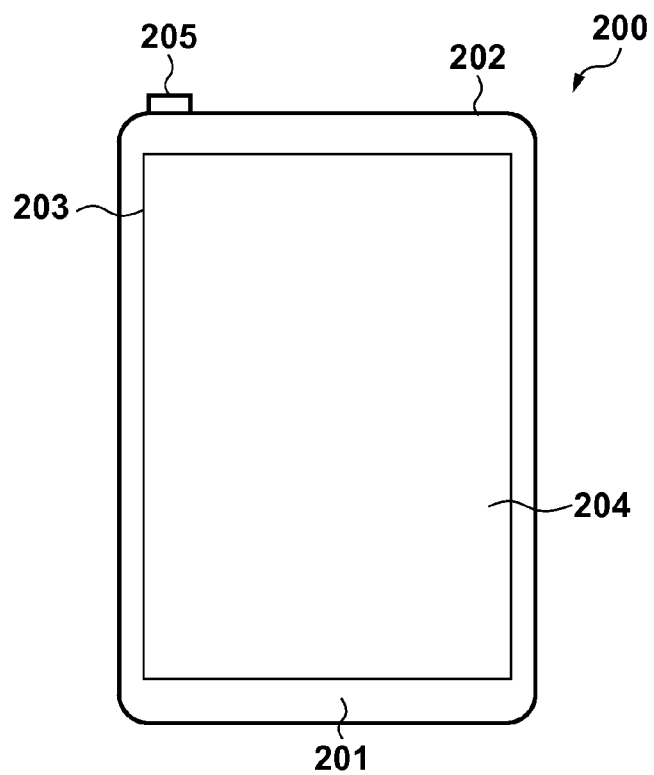
FIG. 2 is a view showing the outer appearance of a portable communication terminal apparatus.

FIG. 2 is a view showing the outer appearance of the portable communication terminal apparatus 200.

In this embodiment, a smartphone will be exemplified. The smartphone indicates a multi-function mobile phone which incorporates a camera, web browser, email function, and the like in addition to functions of a mobile phone. An NFC unit 201 is a unit for performing communication using NFC. When the NFC unit 201 is moved closer to a partner NFC unit within a predetermined distance (for example, about 10 cm), they can communicate with each other using NFC.

A WLAN unit 202 is a unit used to perform communication by WLAN. Assume that the WLAN unit 202 can perform data (packet) communication in a WLAN system complying with, for example, IEEE802.11 series. Examples of wireless communication using the WLAN unit 202 include communication based on Wi-Fi Direct (WFD), and communication in a software AP mode, ad hoc mode, and infrastructure mode. A display unit 203 is, for example, a display having an LCD display mechanism. An operation unit 204 includes a touch-panel operation mechanism, and detects an operation by the user. As a representative operation method, the display unit 203 displays button icons and a software keyboard, and when the user touches them, operation events are detected. A power key 205 is a hard key used to turn on/off the power.

Figure 3A:
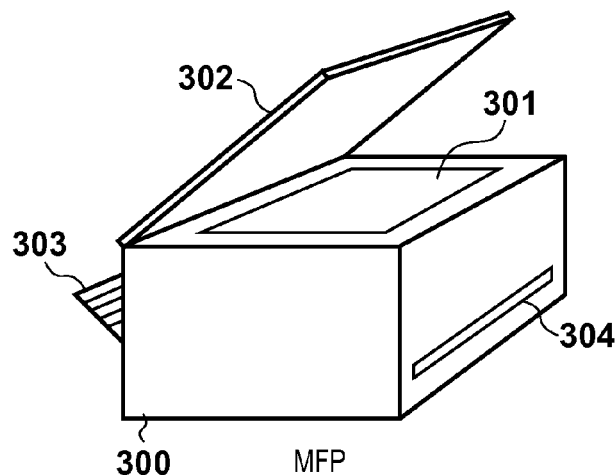
FIG. 3A is a view showing the outer appearance of an MFP.
Figure 3B:
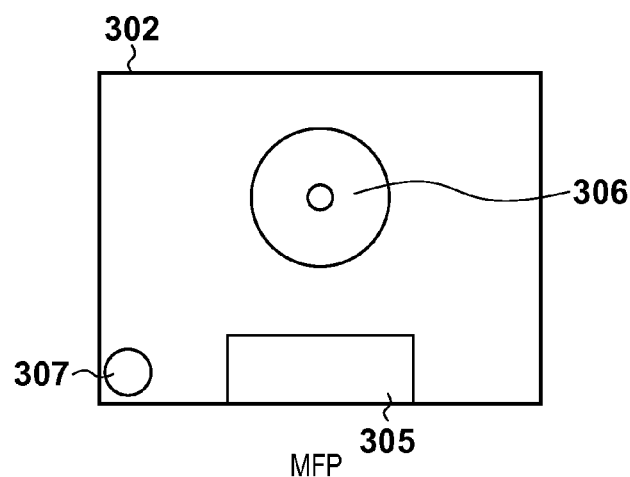
FIG. 3B is a view showing the outer appearance of the MFP.

FIGS. 3A and 3B are views showing the outer appearance of the MFP 300.

Referring to FIG. 3A, a document table 301 is a glass-like transparent table on which a document to be read by a scanner (reading unit) is placed. A document cover 302 is a cover used to press a document when the scanner reads the document, and prevent external leakage of light from a light source, with which the document is irradiated at the time of reading. A printing paper insert port 303 is an insert port on which paper sheets of various sizes can be set. Paper sheets set on the printing paper insert port 303 are conveyed one by one to a printing unit, and are discharged from a printing paper discharge port 304 after printing is performed by the printing unit.

Referring to FIG. 3B, an operation display unit 305 and an NFC unit 306 are arranged on the upper portion of the document cover 302. The operation display unit 305 will be described in detail with reference to FIG. 4. The NFC unit 306 is a unit used to perform short distance wireless communication, and is a place where the portable communication terminal apparatus 200 is moved closer to the MFP 300. A predetermined distance (about 10 cm) from the NFC unit 306 is an effective distance of NFC communication. A WLAN antenna 307 is an antenna which is used to perform communication by WLAN and is embedded in the MFP.

Figure 4:
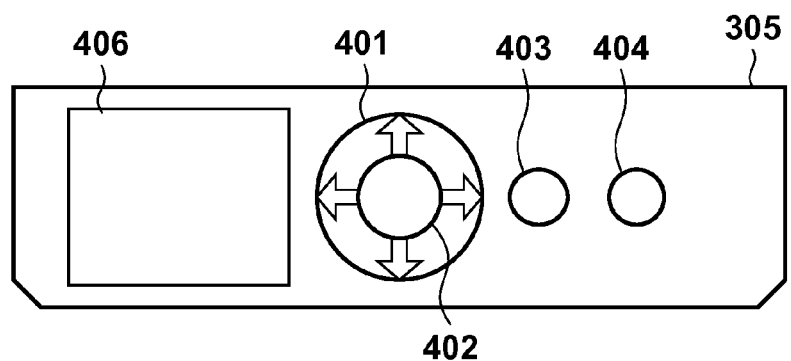
FIG. 4 is a view showing an example of the operation unit of the MFP.

FIG. 4 is a plan view showing the operation display unit 305.

A display unit 406 is a display screen used to display images and a user interface such as an operation menu, and includes, for example, a dot matrix LCD. A 4-way selector 401 is used for operations such as cursor movements on the display unit 406. A set key 402 is a key used to input settings. A function key 403 is used for an operation such as a function setting operation. A start key 404 is used to issue a function execution instruction such as a print start instruction.

Figure 5:
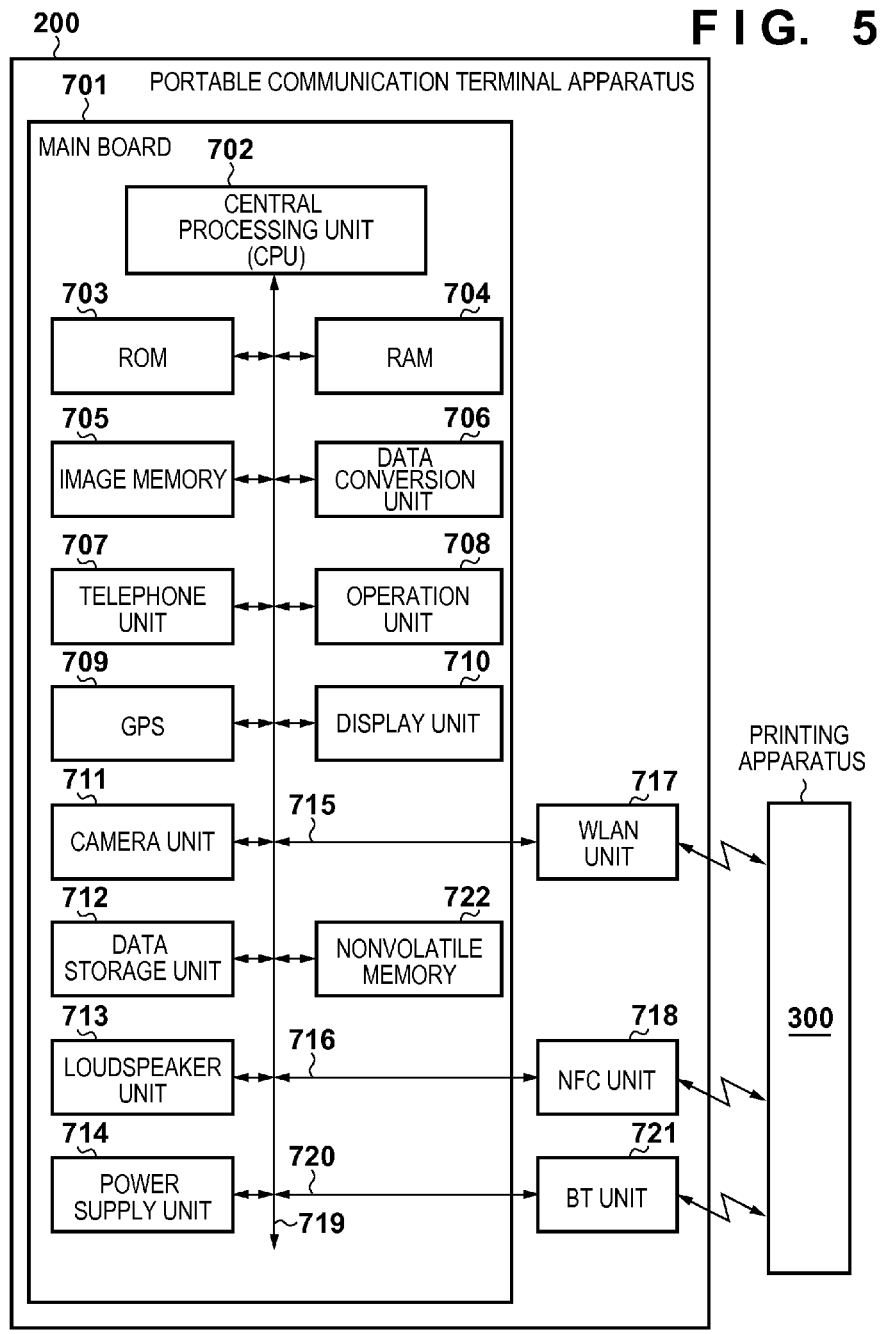
FIG. 5 is a block diagram showing the arrangement of the portable communication terminal apparatus.

FIG. 5 is a block diagram showing the arrangement of the portable communication terminal apparatus 200.

The portable communication terminal apparatus 200 includes a main board 701 for executing main control of the apparatus itself, a WLAN unit 717 for performing WLAN communication, an NFC unit 718 for performing NFC communication, and a BT unit 721 for performing Bluetooth® communication.

In the main board 701, a CPU (Central Processing Unit) 702 is a system control unit, and controls the overall portable communication terminal apparatus 200. The following processing by the portable communication terminal apparatus 200 is executed under the control of the CPU 702. A ROM 703 stores control programs to be executed by the CPU 702, an embedded operating system (OS) program, and the like. In this embodiment, the respective control programs stored in the ROM 703 execute software control such as scheduling and task switching under the management of the embedded OS stored in the ROM 703.

A RAM 704 is implemented by an SRAM (Static RAM) or the like, stores data such as program control variables, also stores data such as setting values registered by the user and management data of the portable communication terminal apparatus 200, and is allocated with various work buffer areas.

An image memory 705 is implemented by a memory such as a DRAM (Dynamic RAM), and temporarily stores image data received via a communication unit and those read out from a data storage unit 712 so as to be processed by the CPU 702. Note that the communication unit is a general term for communication functions including the WLAN unit 717, NFC unit 718, and BT unit 721.

A nonvolatile memory 722 is implemented by a memory such as a flash memory, and continues to store data even after power-off. Note that the memory structure is not limited to this. For example, the image memory 705 and the RAM 704 may share a memory, or data may be backed up in the data storage unit 712. In this embodiment, a DRAM is used as the image memory 705. However, the present invention is not limited to this since another storage medium such as a hard disk or a nonvolatile memory may be used.

A data conversion unit 706 executes analysis of data of various formats, and data conversion such as color conversion and image conversion. A telephone unit 707 controls a telephone line, and implements telephone communication by processing audio data input/output via a loudspeaker unit 713. An operation unit 708 controls signals of the operation unit 204 (FIG. 2). A GPS (Global Positioning System) 709 acquires position information such as the current latitude and longitude of the portable communication terminal apparatus 200. A display unit 710 electronically controls the display contents of the display unit 203 (FIG. 2), allows various input operations, and can display operation states, status conditions, and the like of the MFP 300.

A camera unit 711 has a function of electronically recording and encoding an image input via a lens. An image captured by the camera unit 711 is saved in the data storage unit 712. The loudspeaker unit 713 implements a function of inputting or outputting a speech for a telephone function, and also an alarm notification function and the like. A power supply unit 714 is implemented by a portable battery, and controls power supply to the apparatus. A power supply state includes a battery dead state in which the battery has no remaining amount, a power-off state in which the power key 205 is not pressed, an active state in which the apparatus is normally active, and a power saving state in which the apparatus is active but is set in a power saving mode.

The portable communication terminal apparatus 200 incorporates three communication units used to perform wireless communication, and can perform wireless communication by WLAN, NFC, and Bluetooth®. Thus, the portable communication terminal apparatus 200 performs data communication with another device such as an MFP. Each communication unit converts data into packets, and transmits the packets to the other device. Conversely, each communication unit converts packets coming from another external device into original data, and transmits the data to the CPU 702. The WLAN unit 717, NFC unit 718, and BT unit 721 are connected to the main board 701 via bus cables 715, 716, and 720, respectively. The WLAN unit 717, NFC unit 718, and BT unit 721 are units each used to attain communication complying with its standard.

The respective components 703 to 714, 717, 718, 721, and 722 of the main board 701 are connected to each other via a system bus 719 managed by the CPU 702.

Figure 6:
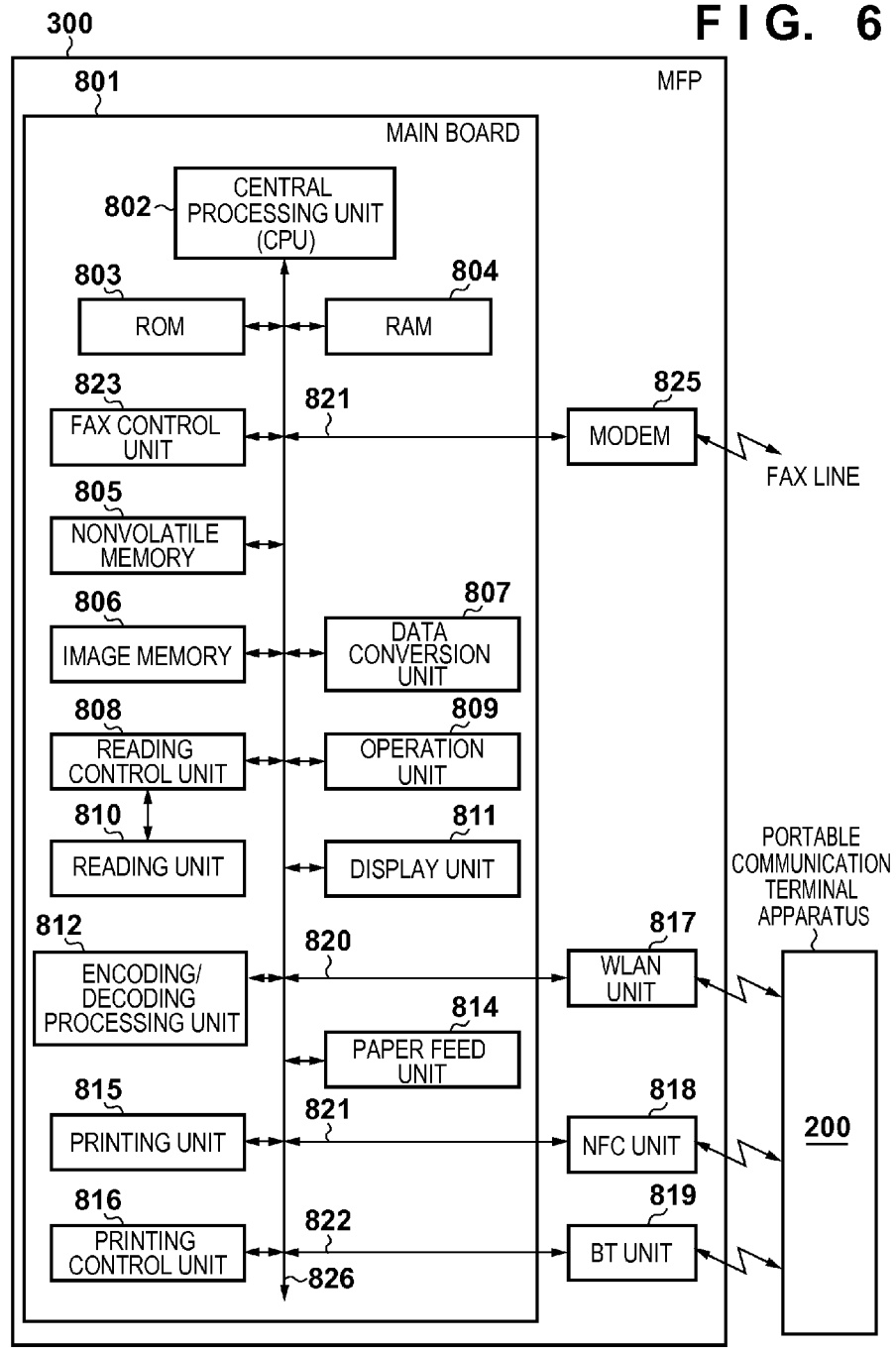
FIG. 6 is a block diagram showing the arrangement of the MFP.

FIG. 6 is a block diagram showing the arrangement of the MFP 300.

The MFP 300 includes a main board 801 for executing main control of the apparatus itself, a WLAN unit 817 for performing WLAN communication, an NFC unit 818 for performing NFC communication, and a BT unit 819 for performing Bluetooth® communication.

In the main board 801, a CPU (Central Processing Unit) 802 is a system control unit, and controls the overall MFP 300. The following processing by the MFP 300 is executed under the control of the CPU 802. A ROM 803 stores control programs to be executed by the CPU 802, an embedded operating system (OS) program, and the like. In this embodiment, the respective control programs stored in the ROM 803 perform software control such as scheduling and task switching under the management of the embedded OS stored in the ROM 803. A RAM 804 is implemented by an SRAM (Static RAM) or the like, stores data such as program control variables, also stores data such as setting values registered by the user and management data of the MFP 300, and is allocated with various work buffer areas.

A nonvolatile memory 805 is implemented by a memory such as a flash memory, and continues to store data even after power-off. An image memory 806 is implemented by a memory such as a DRAM (Dynamic RAM), and stores image data received via a communication unit, and those processed by an encoding/decoding processing unit 812. Also, the memory structure is not limited to this, similarly to the memory structure of the portable communication terminal apparatus 200. A data conversion unit 807 executes analysis of data of various formats, conversion from image data into print data, and the like.

Note that the communication unit is a general term for communication functions including the WLAN unit 817, NFC unit 818, and BT unit 819.

A reading control unit 808 controls a reading unit 810 (for example, a CIS image sensor (contact type image sensor)) to optically read an image on a document. Next, an image signal obtained by converting the read image into electrical image data is output. At this time, various kinds of image processing such as binarization processing and halftone processing may be performed for the image signal, thereby outputting the resultant data.

An operation unit 809 and a display unit 811 correspond to the operation display unit 305 shown in FIG. 4. The encoding/decoding processing unit 812 executes encoding/ decoding processing and enlargement/reduction processing for image data (JPEG, PNG, or the like) handled by the MFP 300. A paper feed unit 814 holds paper sheets used in printing. A paper sheet can be fed from the paper feed unit 814 under the control of a printing control unit 816. Especially, as the paper feed unit 814, a plurality of paper feed units can be prepared so as to hold a plurality of types of paper sheets in one apparatus. Then, the printing control unit 816 can control to select a paper feed unit to be used to supply paper sheets.

The printing control unit 816 performs various kinds of image processing such as smoothing processing, printing density correction processing, and color correction for image data to be printed, and outputs the resultant data to a printing unit 815. The printing unit 815 can adopt an inkjet printer which prints an image by discharging, from a printhead, ink supplied from an ink tank. The printing control unit 816 also serves to periodically read out information of the printing unit 815, and update information in the RAM 804. More specifically, the printing control unit 816 updates status information such as the remaining amount of an ink tank and a printhead state.

The MFP 300 also incorporates three communication units used to perform wireless communication, similarly to the portable communication terminal apparatus 200, and a description of these communication units will be omitted since their functions are the same. The WLAN unit 817, NFC unit 818, and BT unit 819 are connected to the main board 801 via bus cables 820, 821, and 822, respectively. Note that the portable communication terminal apparatus 200 and the MFP 300 can perform communication based on WFD, and has a software access point (software AP) function.

The respective components 802 to 819 of the main board 801 are connected to each other via a system bus 826 managed by the CPU 802.

<P2P (Peer to Peer) Method>

As a method of implementing the P2P mode (peer-to-peer mode) in communication by WLAN, a plurality of modes are plausible. In each mode, a discovery device searches for a device (communication partner apparatus) as a communication partner using the same device discovery command (for example, Probe Request frame), thereby discovering the device. It is possible to transmit a device discovery command added with various attributes (parameters). It is recommended that when attributes are designated in the discovery command, the device responds to interpretable attributes as much as possible within a range defined by the specifications of the mode and assumed specifications (Wi-Fi for WFD) as a response to the device discovery command. Even if information (including the above attributes) added to the device discovery command includes uninterpretable information, it is possible to respond to the received device discovery command based on only interpretable information.

As modes in the P2P mode, the following three modes are plausible.
mode A (software AP mode)
mode B (Wi-Fi Direct (WFD) mode)
mode C (WFD extend mode)

For the respective modes, compatible devices may be different, and usable applications may also be different.

Wireless connection sequences in the respective modes will be described below with reference to FIGS. 7 to 9.

FIG. 7 is a sequence chart showing a wireless connection sequence in mode A (software AP mode).

In the software AP mode, among devices (for example, the portable communication terminal apparatus 200 and the MFP 300) which communicate with each other, one (for example, the portable communication terminal apparatus 200) serves as a client which requests various services, and the other (for example, MFP 300) serves as a software AP which implements the function of an access point in WLAN by software settings.

In the software AP mode, the client discovers a device to serve as a software AP by using a device discovery command. When the software AP is discovered, the remaining wireless connection processing (establishment of a wireless connection and the like) is performed between the client and the software AP, and then IP connection processing (assignment of IP addresses and the like) is executed.

Note that it is only necessary to use commands and parameters defined by the Wi-Fi standard as those transmitted/received to implement wireless connection between the client and the software AP, and a description thereof will be omitted.

FIG. 8 is a sequence chart showing a wireless connection sequence in mode B (WFD mode).

In the WFD mode, after a device as a communication partner is discovered by a device discovery command, the roles of a P2P group owner and P2P client are decided, and wireless connection is performed. The role decision processing corresponds to, for example, GO Negotiation in P2P.

More specifically, one of devices which communicate with each other issues a device discovery command, and discovers a device to be connected in the WFD mode. When the other device as a communication partner is discovered, the devices confirm information about services and functions which can be provided to each other (device provision information confirmation). Note that the device provision information confirmation phase is not essential but optional. The device provision information confirmation phase corresponds to, for example, Provision Discovery in P2P.

By confirming the device provision information, which of the devices serves as a P2P client or a P2P group owner is decided. When the P2P client and group owner are decided, they exchange parameters for performing communication by Wi-Fi Direct (parameter exchange phase). The client and the group owner perform the remaining wireless connection processing and IP connection processing based on the exchanged parameters. The parameter exchange phase corresponds to, for example, automatically exchanging parameters for wireless LAN security using Wi-Fi Protected Setup.

Figure 9:
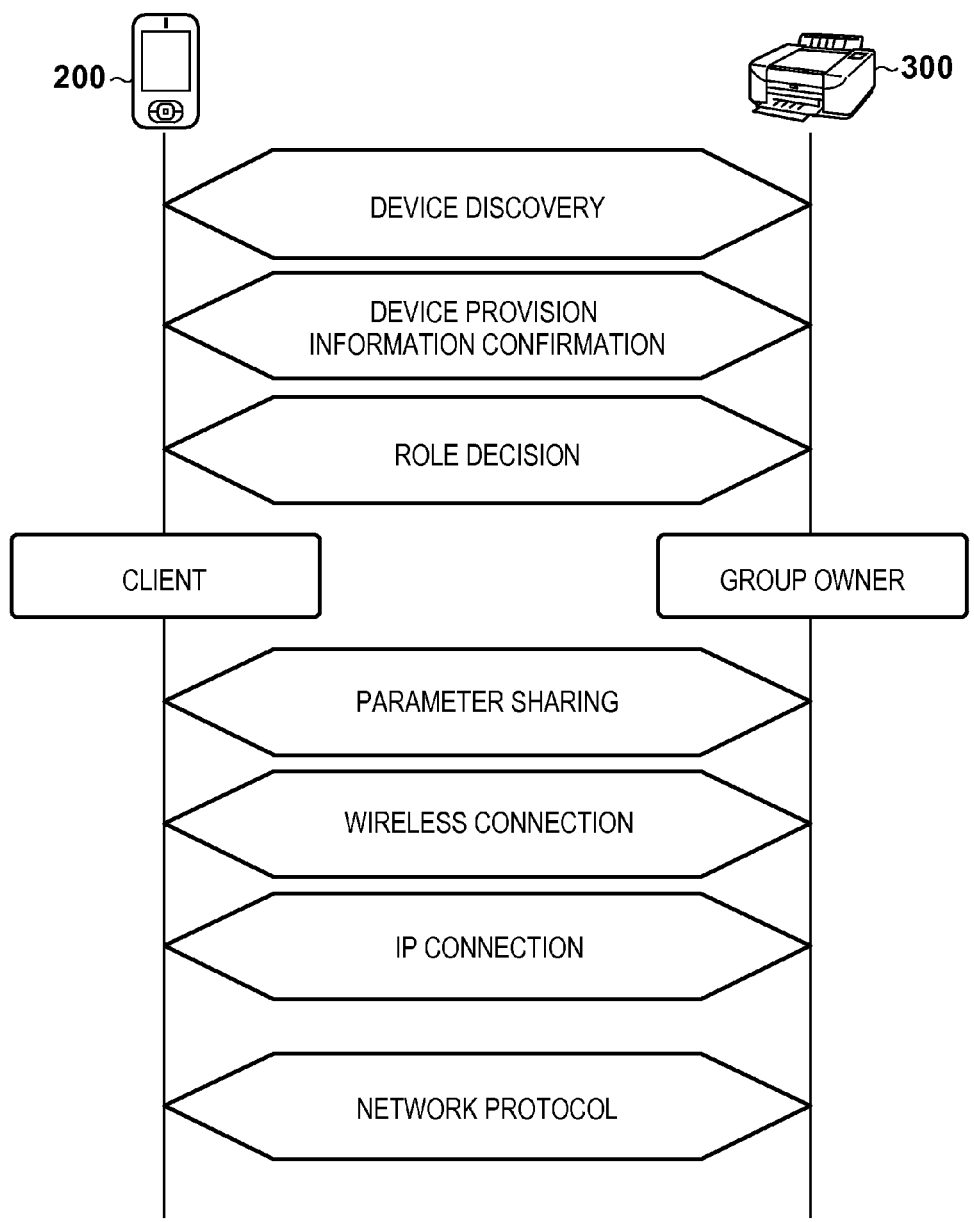
FIG. 9 is a sequence chart showing a wireless connection sequence in mode C (a WFD extend mode)

FIG. 9 is a sequence chart showing a wireless connection sequence in mode C (WFD extend mode).

The WFD extend mode is a mode obtained by extending the WFD mode, and requires device provision information confirmation which is optional in the WFD mode. Furthermore, after IP connection processing, service connection processing is performed.

First Embodiment

In the first embodiment, assume an environment in which a device can operate in two types of communication modes, that is, the infrastructure mode (a first communication mode) and the P2P mode (a second communication mode) simultaneously using one communication unit (WLAN unit 717/WLAN unit 817). That is, the WLAN unit 717/WLAN unit 817 performs communication via a common channel when parallelly performing communication operations in a plurality of communication modes. In this case, an arrangement of adjusting an Owner Intent (a group owner intent index)

indicating the strength of the intent to become a group owner (service providing source) in the P2P mode (WFD mode) will be explained. This adjustment processing prevents an unintended channel from being assigned in each mode.

Note that the Owner Intent has a default value preset before a communication apparatus performs wireless connection. The value is a value embedded in a memory at the time of manufacturing a communication apparatus or a value settable by the user.

Note that the Owner Intent takes, for example, a value between 0 (Min) and 15 (Max). An apparatus whose Owner Intent is higher becomes a group owner. The infrastructure mode is a mode in which communication is performed via an access point. The P2P mode is a mode in which direct communication with a communication partner apparatus is performed.

Figure 10:
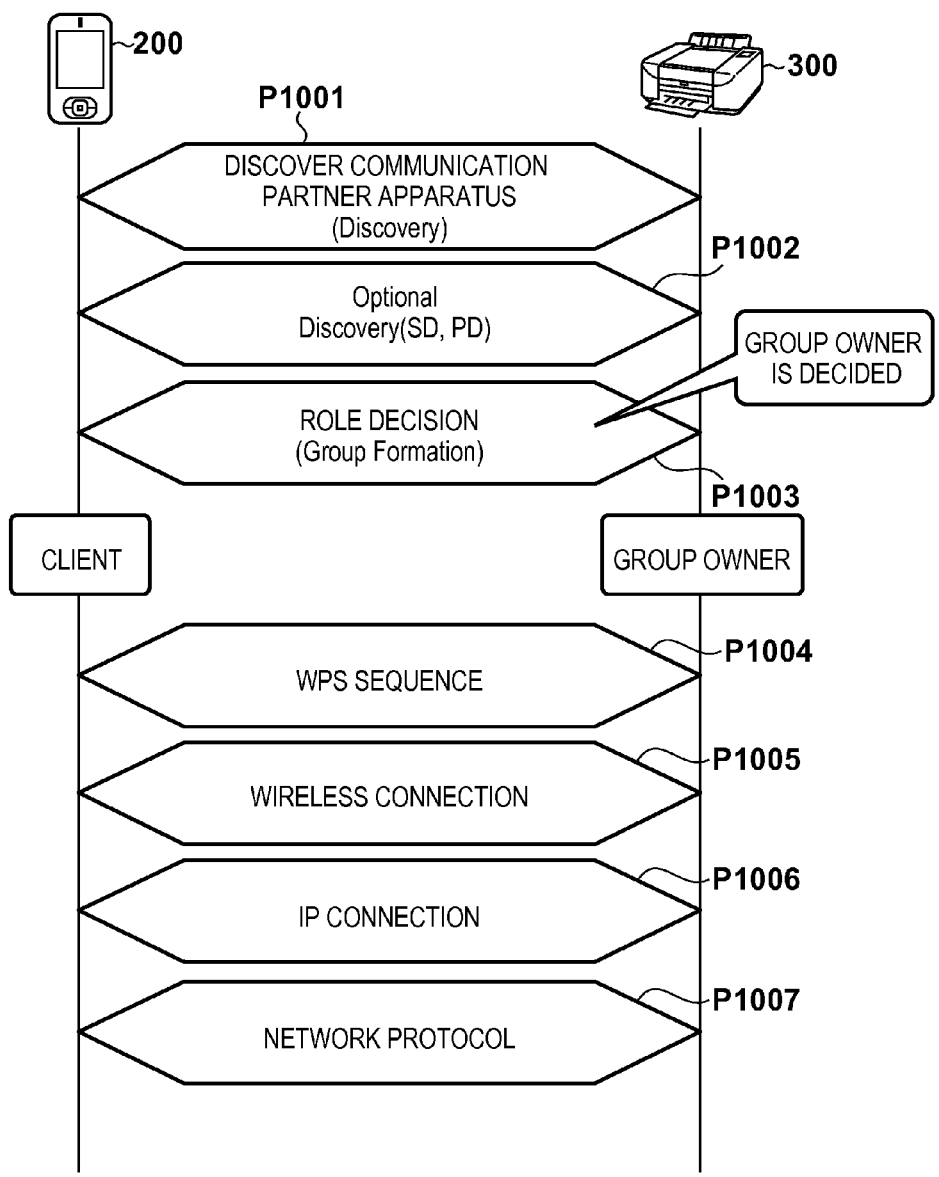
FIG. 10 is a sequence chart for explaining a practical operation in a wireless connection phase in the WFD mode according to the first embodiment.

A practical operation in the wireless connection phase in the WFD mode will now be described with reference to FIG. 10. Note that FIG. 10 complies with FIGS. 8 and 9.

P1001: A communication partner apparatus is found by device discovery processing. This is implemented when, for example, one communication apparatus (for example, a portable communication terminal apparatus 200) issues a device discovery request (Discovery) command, and another communication apparatus (an MFP 300) as a communication partner apparatus responds to the request.

P1002: When the communication partner apparatus is determined, the apparatuses which communicate with each other confirm information about services and functions which can be provided to each other (device provision information confirmation). This is implemented by using an Optional Discovery command and a Provision Discovery command.

P1003: A role decision phase is performed to decide which of the apparatuses serves as a client or a group owner by Group Owner Negotiation (Group Formation).

Note that Group Owner Negotiation as processing for deciding a group owner is performed by exchanging three (3-way) pieces of information, that is, a GO Negotiation Request frame, a GO Negotiation Response frame, and a GO Negotiation Confirmation frame.

If Group Owner Negotiation has failed, it is possible to grasp whether Group Owner Negotiation has succeeded or failed by monitoring the GO Negotiation Response frame using a packet capture tool. Furthermore, if Group Owner Negotiation has failed, it is possible to grasp a factor for the failure.

Alternatively, if Group Owner Negotiation has failed, firmware is used to analyze the GO Negotiation Response frame. This analysis processing makes it possible to grasp whether Group Owner Negotiation has succeeded or failed by checking the value of the Status Code of a Status attribute in the GO Negotiation Response frame. Furthermore, if Group Owner Negotiation has failed, it is possible to grasp a factor for the failure.

P1004: After the client and the group owner are decided, they exchange parameters for performing parameters by Wi-Fi Direct (WPS sequence).

P1005: The remaining wireless connection processing is performed between the client and the group owner.

P1006: IP connection processing is performed between the client and the group owner.

P1007: Communication is performed using a network protocol between the client and the group owner.

In the first embodiment, when starting wireless connection in the WFD mode, a communication apparatus confirms a communication mode. If it is determined that the communication apparatus is operating in the infrastructure mode and the P2P mode simultaneously, the communication apparatus sets its Owner Intent to 15, and connects to a communication partner apparatus. On the other hand, if it is determined that the communication apparatus is operating in only the P2P mode, the communication apparatus sets its Owner Intent to a value equal to or smaller than 14, and performs connection.

With this processing, if the communication apparatus is operating in the infrastructure mode and the P2P mode simultaneously, it can become a group owner in the P2P mode. That is, since the communication apparatus serving as a group owner can set a channel assigned in the infrastructure mode to also be used in the P2P mode, it can normally operate in the respective modes.

Processing executed by the MFP 300 according to the first embodiment will be described below with reference to FIG. 11. Note that a case in which after the MFP 300 issues a device discovery request and discovers a communication partner apparatus (for example, the portable communication terminal apparatus 200), it confirms its communication mode, and sets its Owner Intent based on the confirmation result will be exemplified with reference to FIG. 11. This processing is not limited to the MFP 300, and can be implemented by the portable communication terminal apparatus 200.

Figure 11:
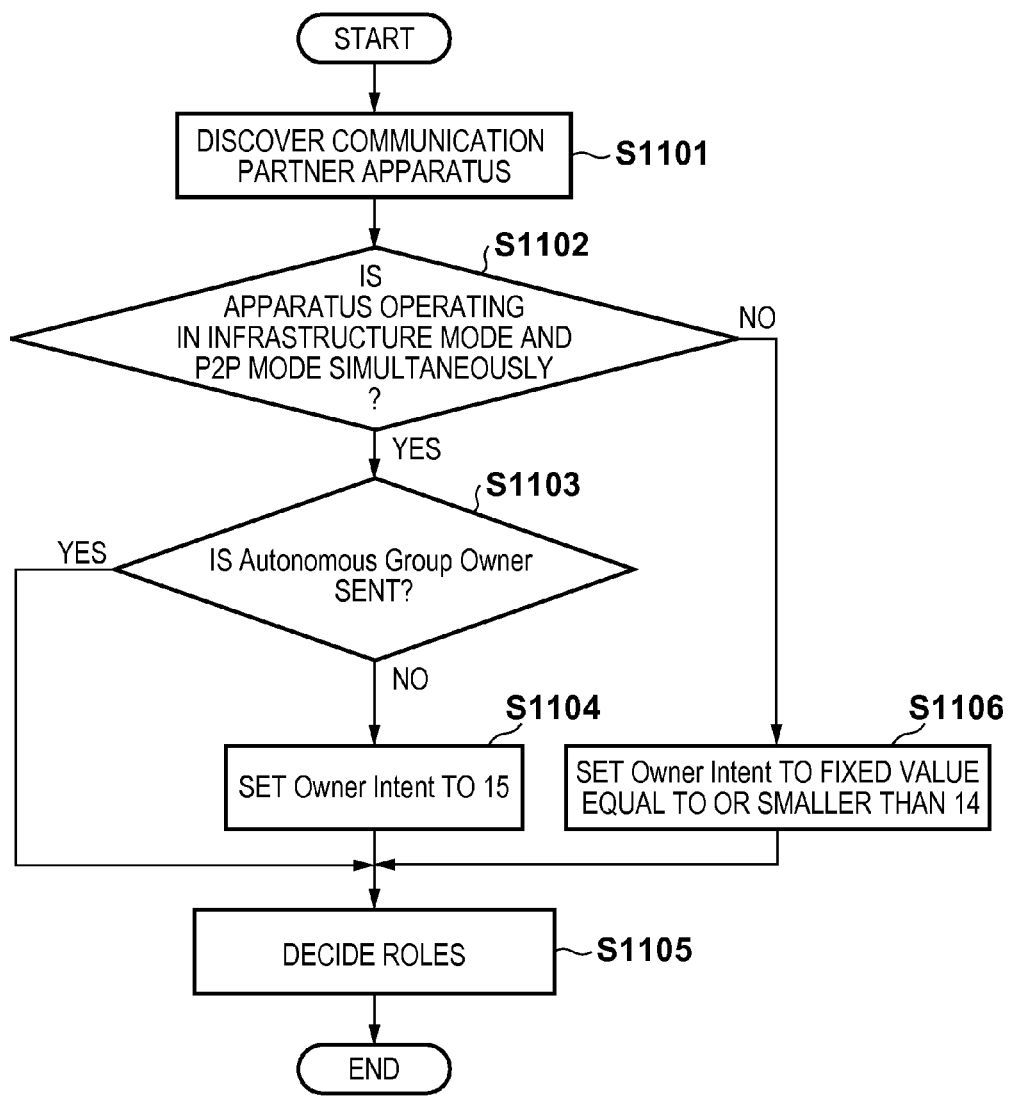
FIG. 11 is a flowchart illustrating processing executed by an MFP according to the first embodiment.

FIG. 11 is a flowchart illustrating the processing executed by the MFP 300 according to the first embodiment.

In step S1101, the MFP 300 discovers a communication partner apparatus (the portable communication terminal apparatus 200) in the P2P mode.

In step S1102, the MFP 300 determines whether it is operating in the infrastructure mode and P2P mode simultaneously as its communication modes (mode determination). If the MFP 300 is operating in the modes simultaneously (YES in step S1102), it determines in step S1103 whether to notify the communication partner apparatus (portable communication terminal apparatus 200) of Autonomous Group Owner information. If the communication partner apparatus (portable communication terminal apparatus 200) is notified of Autonomous Group Owner information (YES in step S1103), the MFP 300 becomes a group owner, thereby establishing a connection with the communication partner apparatus.

On the other hand, if the communication partner apparatus (portable communication terminal apparatus 200) is not notified of Autonomous Group Owner information (NO in step S1103), in step S1104 the MFP 300 sets the value of the Owner Intent to a maximum value of 15. If the default value of the Owner Intent stored in the MFP 300 is 15, that value is set intact; otherwise, the value of the Owner Intent is changed to 15. Note that the value of the Owner Intent is stored in, for example, a nonvolatile memory 805. In step S1105, the MFP 300 performs role decision processing. In this case, the MFP 300 sets itself as a group owner and the communication partner apparatus as a client.

On the other hand, if the MFP 300 is not operating in the modes simultaneously (NO in step S1102), in step S1106 the MFP 300 sets the default value of the Owner Intent to a value smaller than the maximum value, that is, a fixed value equal to or smaller than 14. In this case, in step S1105, the MFP 300 performs role decision processing. More specifically, the MFP 300 compares its Owner Intent with that of the communication partner apparatus, and sets one of the apparatuses as a group owner and the other as a client based on the comparison result. Note that if the MFP 300 is not operating in the modes simultaneously, it is operating in only the P2P mode. Therefore, if the default value is 15, the value may be maintained.

As described above, according to the first embodiment, if a communication apparatus operates in the infrastructure mode and the P2P mode simultaneously, it can become a group owner in the P2P mode. That is, since the communication apparatus serving as a group owner can set a channel assigned in the infrastructure mode to also be used in the P2P mode, it can normally operate in the respective modes.

Second Embodiment

Figure 12:
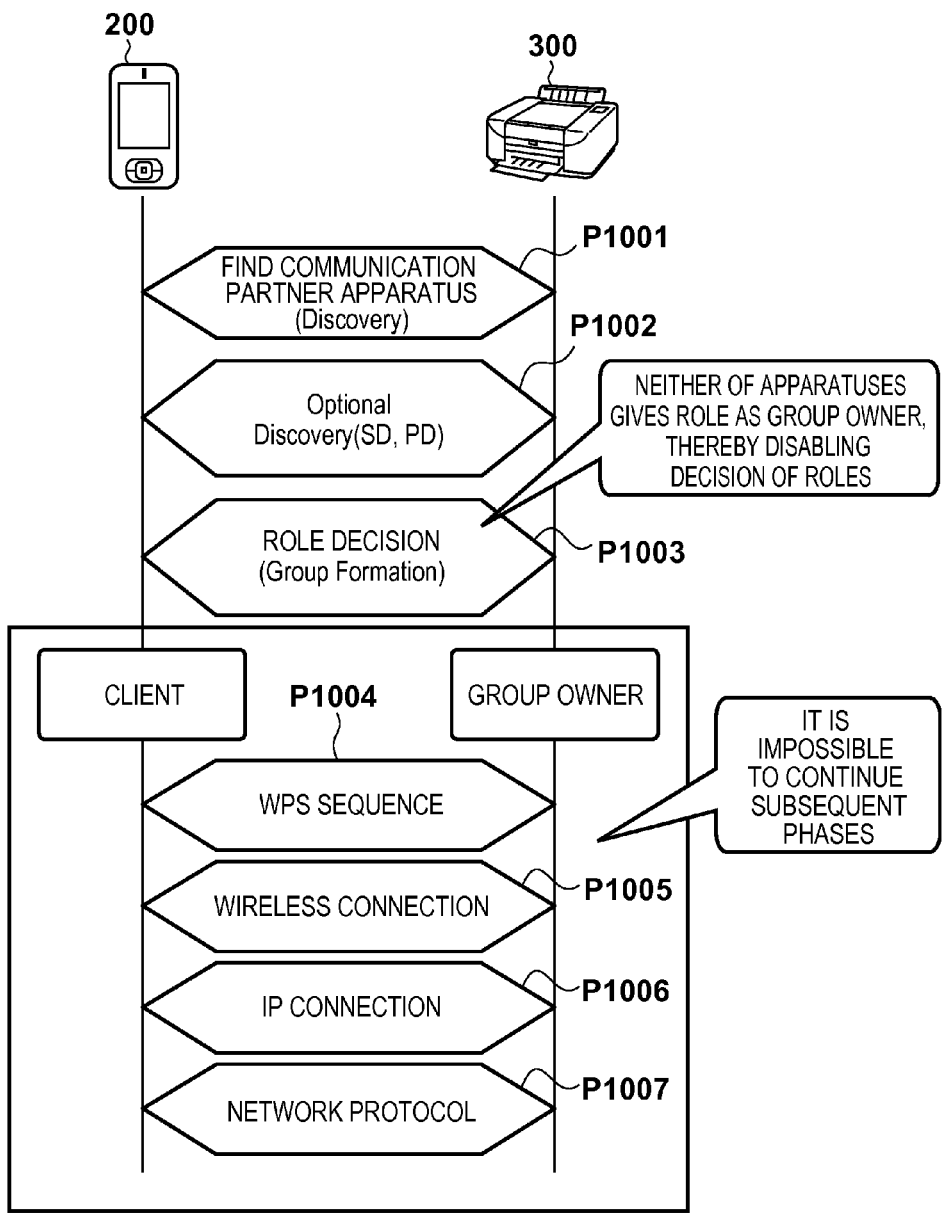
FIG. 12 is a sequence chart for explaining an operation according to the second embodiment.

In the wireless connection sequence shown in FIG. 10, an operation when the values of the Owner Intents of apparatuses which communicate with each other are both a maximum value of 15 will be described with reference to FIG. 12.

If, for example, the values of the Owner Intents of a portable communication terminal apparatus 200 and MFP 300 are both a maximum value of 15, both the portable communication terminal apparatus 200 and the MFP 300 intend to be a group owner in the phase P1003. That is, since neither the portable communication terminal apparatus 200 nor MFP 300 gives a role as a group owner, negotiation in the phase P1003 fails, thereby disabling decision of roles as a group owner and client.

Consequently, it becomes impossible to continue the subsequent phases P1004 to P1007, resulting in a failure in wireless connection by WFD.

To solve this problem, in the second embodiment, an arrangement in which the initial values of the Owner Intents of the communication apparatuses are both a maximum value (15), connection by WFD is normally performed by adjusting the value of the Owner Intent of the self communication apparatus according to the device type of the communication partner apparatus will be explained.

Figure 13:
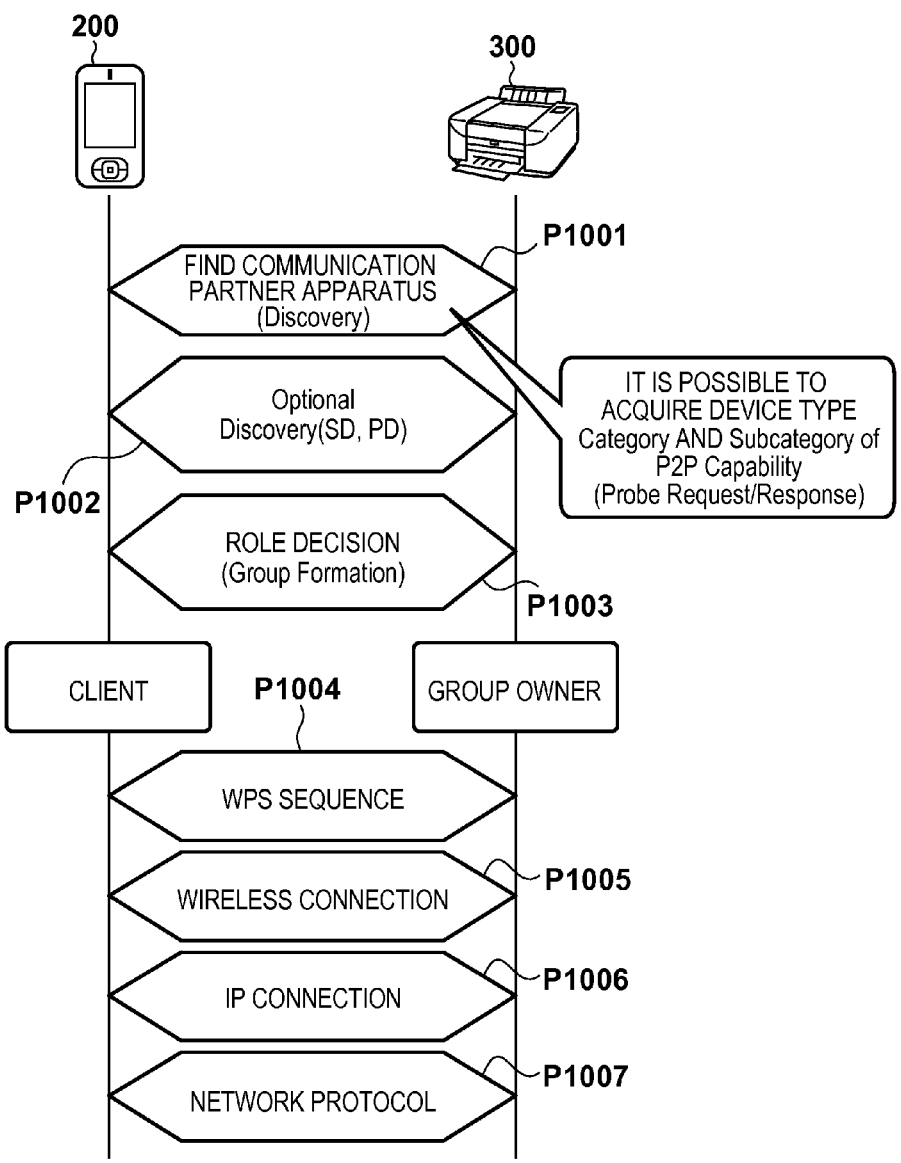
FIG. 13 is a sequence chart for explaining an operation according to the second embodiment.

In the wireless connection phase in the WFD mode described with reference to FIG. 10, as shown in FIG. 13, it is possible to acquire a device type as device information of a communication partner apparatus when the communication partner apparatus is found in the phase P1001. More specifically, this device type acquisition processing is performed by using the Category and Subcategory (Probe Request/Response) of a P2P Capability defined by the Wi-Fi Direct wireless communication standard.

Processing executed by the MFP 300 according to the second embodiment will be explained below with reference to FIG. 14. Note that a case will be exemplified with reference to FIG. 14 in which after the MFP 300 issues a device discovery request and discovers a communication partner apparatus (for example, the portable communication terminal apparatus 200), if the Owner Intents of the apparatuses have been set to 15, the MFP 300 adjusts (re-sets) its Owner Intent based on the device types of the apparatuses. This processing is not limited to the MFP 300, and can be implemented by the portable communication terminal apparatus 200.

Figure 14:
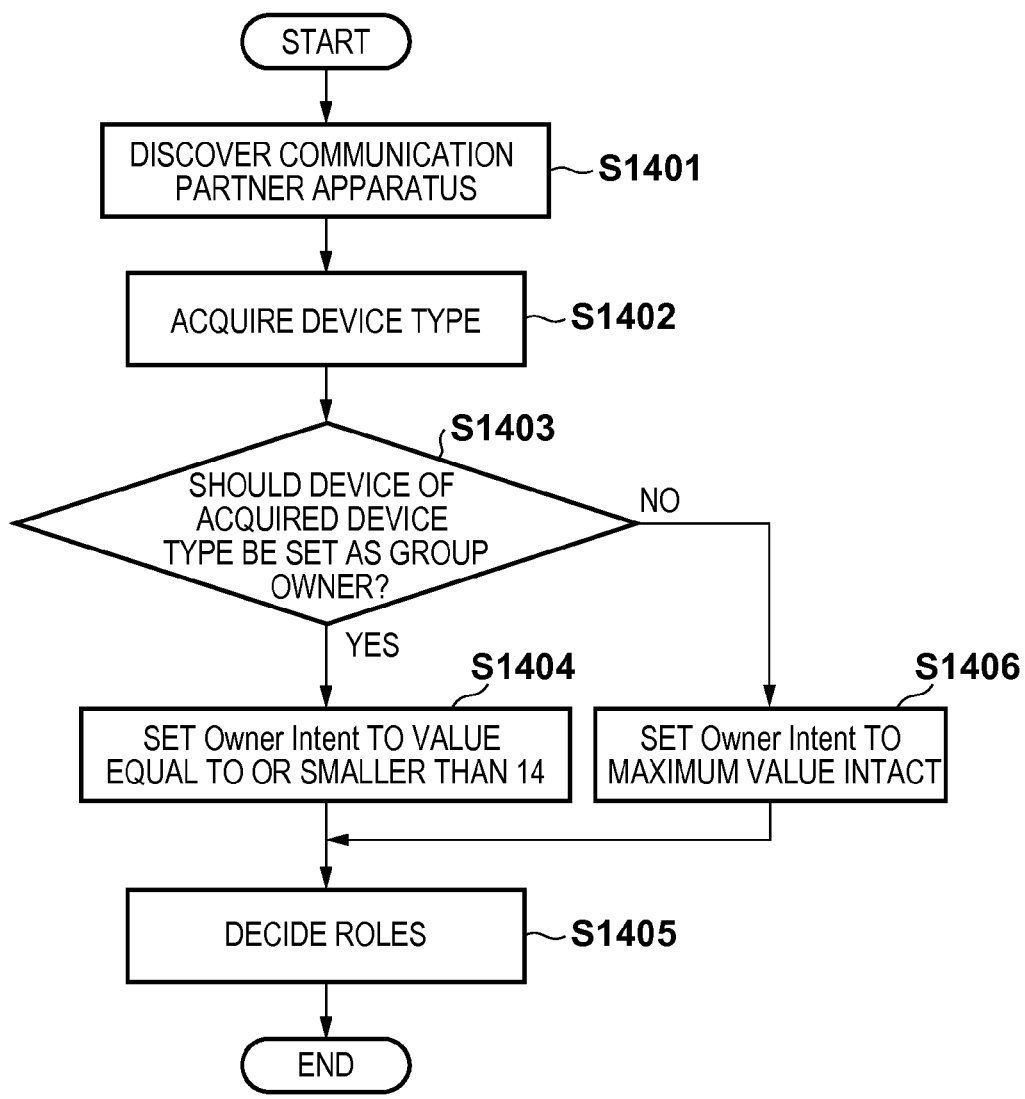
FIG. 14 is a flowchart illustrating processing executed by an MFP according to the second embodiment.

FIG. 14 is a flowchart illustrating the processing executed by the MFP 300 according to the second embodiment.

In step S1401, the MFP 300 discovers a communication partner apparatus (the portable communication terminal apparatus 200) in the P2P mode.

In step S1402, the MFP 300 acquires a device type from device information received from the communication partner apparatus. It is possible to acquire the device type by obtaining the category of the communication apparatus (device type: printer, scanner, multi-function peripheral, computer, input device, display, storage, camera, and the like) using P2P Device Info (which can be returned from the MFP 300 when issuing a role decision processing request) of a P2P Attribute ID. For example, if the communication apparatus determines that the communication partner apparatus is a printer, it decreases its Owner Intent.

In step S1403, the MFP 300 determines whether a device of the acquired device type should be set as a group owner. Note that this determination is made by storing, in advance, in a nonvolatile memory 805 or the like, a table for managing priority levels of device types for setting a group owner, and referring to the table. For example, a higher priority level is set in an apparatus which can provide a larger number of various services (a print service and the like) to a communication partner apparatus. Among, for example, the MFP 300 and the portable communication terminal apparatus 200, the MFP 300 can provide a larger number of various services (a print service and the like) than the portable communication terminal apparatus 200, and thus the priority level of the MFP 300 is set higher than that of the portable communication terminal apparatus 200.

If it is determined that the device of the acquired device type should be set as a group owner (YES in step S1403), in step S1404 the MFP 300 sets the value of the Owner Intent of itself to a value equal to or smaller than 14. Note that the value of the Owner Intent is stored in, for example, the nonvolatile memory 805. In step S1405, the MFP 300 performs role decision processing. In this case, the MFP 300 sets itself as a client so that it can connect using the communication partner apparatus as a group owner.

On the other hand, if it is determined that the device of the acquired device type should not be set as a group owner (NO in step S1403), in step S1406 the MFP 300 sets the value of the Owner Intent of itself to 15 intact. In step S1405, the MFP 300 performs role decision processing. In this case, the MFP 300 sets itself as a group owner and the communication partner apparatus as a client.

As an application of the processing of FIG. 14 executed by the MFP 300, processing when the device type indicates a server category will be explained with reference to FIG. 15. An expression "the device type indicates a server category" means that the communication partner apparatus is a server which provides services like an access point. If the communication partner apparatus is an access point, it is probable that the communication apparatus and the access point are operating (can be active) in the infrastructure mode. In addition, if the communication apparatus is operating as a group owner in the P2P mode, unintended channels may be assigned in the respective modes, as in the first embodiment. To solve this problem, in the second embodiment, if the apparatus is operating in the infrastructure mode and the P2P mode simultaneously, it temporarily disconnects a connection in the infrastructure mode.

Practical processing will be described below with reference to FIG. 15.

Figure 15:
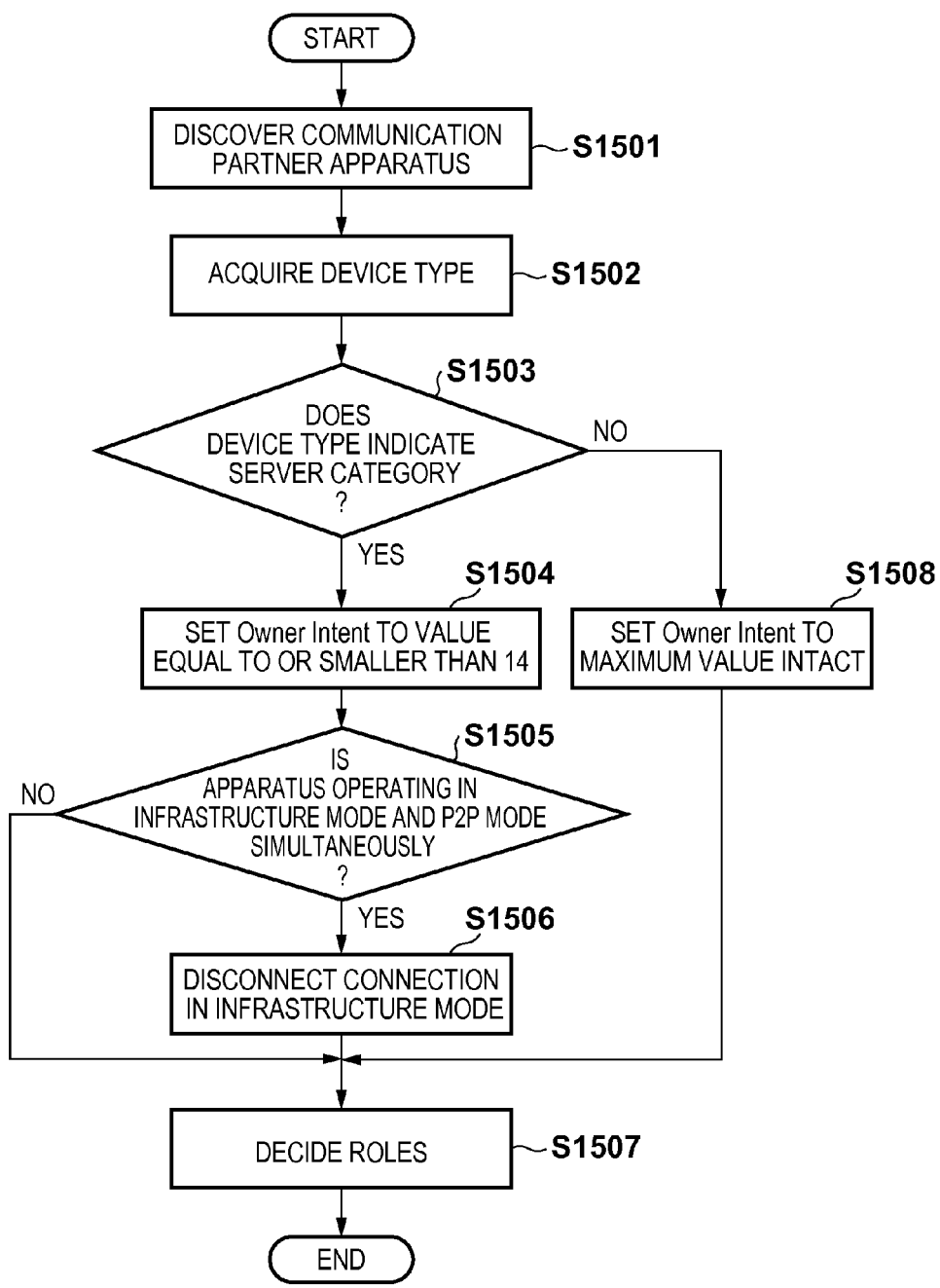
FIG. 15 is a flowchart illustrating processing executed by the MFP according to the second embodiment.

FIG. 15 is a flowchart illustrating processing executed by the MFP 300 according to the second embodiment.

In step S1501, the MFP 300 discovers a communication partner apparatus (the portable communication terminal apparatus 200) in the P2P mode.

In step S1502, the MFP 300 acquires a device type from device information received from the communication partner apparatus.

In step S1503, the MFP 300 determines whether the acquired device type indicates a server category. Note that this determination is made by storing, in advance, in the nonvolatile memory 805 or the like, a table for managing communication partner apparatuses to fall in a server category, and referring to the table.

If it is determined that the acquired device type indicates a server category (YES in step S1503), in step S1504 the MFP 300 sets the value of the Owner Intent of itself to a value equal to or smaller than 14. Note that the value of the Owner Intent is stored in, for example, the nonvolatile memory 805.

In step S1505, it is determined whether the MFP 300 is operating in the infrastructure mode and the P2P mode simultaneously as its communication modes. If the MFP 300 is operating in the modes simultaneously (YES in step S1505), in step S1506 the MFP 300 disconnects a connection in the infrastructure mode. In step S1507, the MFP 300 performs role decision processing with the communication partner apparatus which is operating in the P2P mode. In this case, the MFP 300 sets itself as a group owner and the communication partner apparatus as a client.

On the other hand, if the MFP 300 is not operating in the modes simultaneously (NO in step S1505), in step S1507 the MFP 300 performs role decision processing with the communication partner apparatus which is operating in the P2P mode. In this case, the MFP 300 can set itself as a group owner or client according to the relationship with the communication partner apparatus.

If it is determined in step S1503 that the acquired device type does not indicate a server category (NO in step S1503), in step S1508 the MFP 300 sets the value of the Owner Intent of itself to 15 intact. In step S1507, the MFP 300 performs role decision processing. In this case, the MFP 300 sets itself as a group owner and the communication partner apparatus as a client.

As described above, according to the second embodiment, if the initial values of the Owner Intents of the communication apparatuses are a maximum value (15), it is possible to normally perform connection by WFD by adjusting the value of the Owner Intent of the self communication apparatus according to the device type of the communication partner apparatus.

Note that in the second embodiment, a case in which the initial values of the Owner Intents of the communication apparatuses are a maximum value (15) has been exemplified. The present invention, however, is not limited to this. Even if, for example, the initial values of the Owner Intents of the communication apparatuses equal, the arrangement of the second embodiment is applicable.

Third Embodiment

In the third embodiment, as an application of the second embodiment, an arrangement in which based on the relationship with the communication partner apparatus, an apparatus decreases the Owner Intent of a communication partner apparatus while maintaining the Owner Intent of the self apparatus will be described. Note that this embodiment is not limited to simultaneous operations.

For example, a portable communication terminal apparatus 200 connected to an MFP 300 refers to the MAC address of the MFP 300, and determines whether the MFP 300 is a device whose vendor is the same as that of the self apparatus. If the vendors are the same, the portable communication terminal apparatus 200 decreases its Owner Intent.

Processing executed by the portable communication terminal apparatus 200 according to the third embodiment will be described below with reference to FIG. 16.

Figure 16:
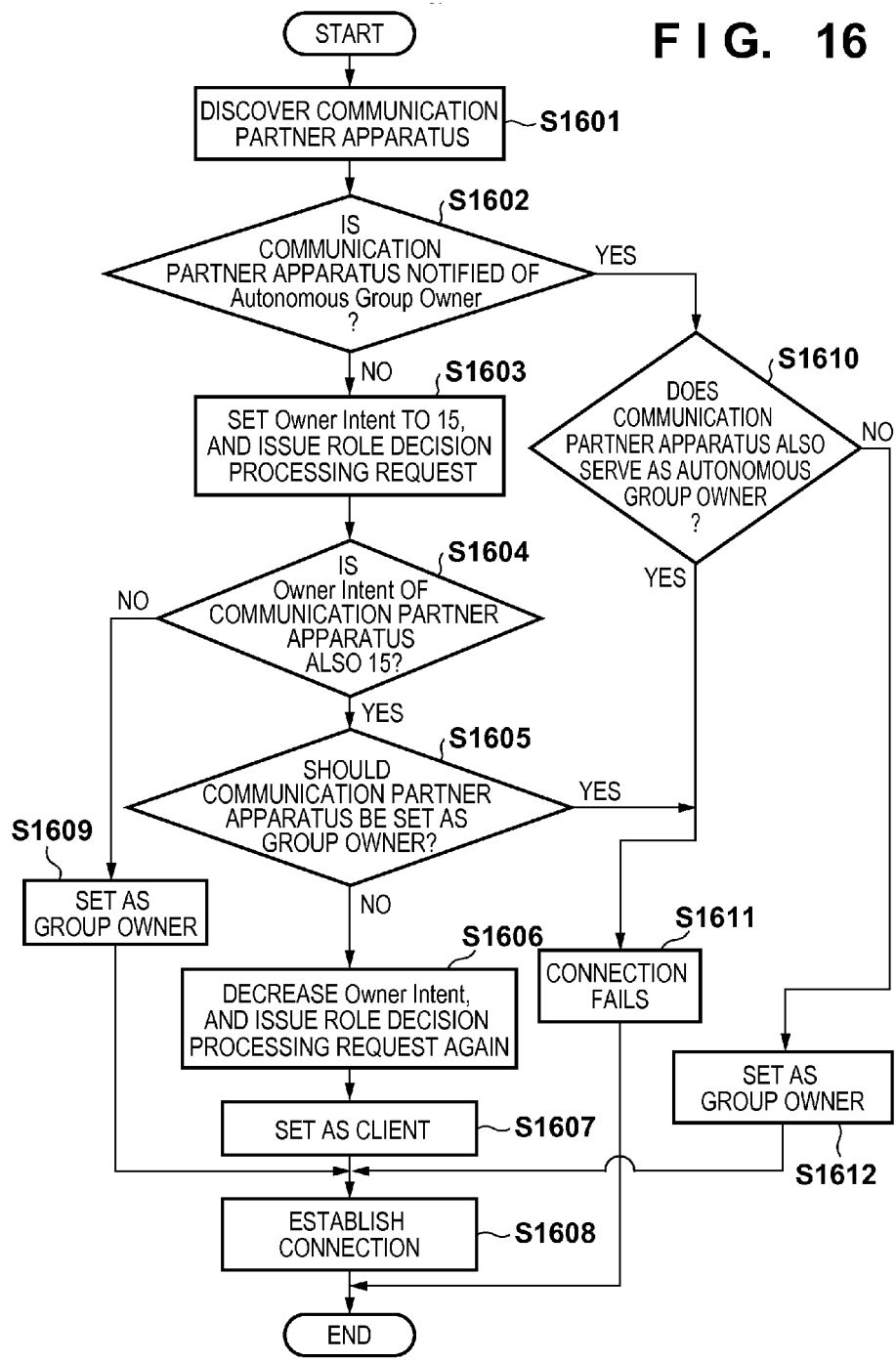
FIG. 16 is a flowchart illustrating processing executed by a portable communication terminal apparatus according to the third embodiment.

FIG. 16 is a flowchart illustrating the processing executed by the portable communication terminal apparatus 200 according to the third embodiment.

In step S1601, the portable communication terminal apparatus 200 discovers a communication partner apparatus (the MFP 300) in the P2P mode.

In step S1602, the portable communication terminal apparatus 200 determines whether to notify the communication partner apparatus of an Autonomous Group Owner. If the communication partner apparatus is notified of the Autonomous Group Owner (YES in step S1602), the portable communication terminal apparatus 200 determines in step S1610 whether the communication partner apparatus also serves as an autonomous group owner. If the communication partner apparatus does not serve as an autonomous group owner (NO in step S1610), in step S1612 the portable communication terminal apparatus 200 serves as a group owner, and establishes a connection with the communication partner apparatus.

On the other hand, if the communication partner apparatus is not notified of an Autonomous Group Owner (NO in step S1602), in step S1603 the portable communication terminal apparatus 200 issues, to the communication partner apparatus, a role decision processing request by setting the Owner Intent to a maximum value of 15.

In step S1604, based on device information transmitted by the communication partner apparatus in response to the role decision processing request, the portable communication terminal apparatus 200 determines whether the value of the Owner Intent of the communication partner apparatus is also a maximum value of 15. If the value of the Owner Intent of the communication partner apparatus is not a maximum value of 15, (NO in step S1604), in step S1609 the portable communication terminal apparatus 200 sets itself as a group owner. After that, in step S1608, the portable communication terminal apparatus 200 serves as a group owner, and establishes a connection with the communication partner apparatus.

On the other hand, if the value of the Owner Intent of the communication partner apparatus is also a maximum value of 15 (YES in step S1604), the portable communication terminal apparatus 200 determines in step S1605 whether the communication partner apparatus should be set as a group owner.

Note that in this determination processing, for example, it is determined whether the MAC address of the communication partner apparatus indicates a device of the same vendor as that which sets the MAC address of the portable communication terminal apparatus 200. If the same vendor is determined, the portable communication terminal apparatus 200 determines that the communication partner apparatus should be set as a group owner.

Alternatively, if the category of the device (device type: printer, scanner, multi-function peripheral, computer, input device, display, storage, camera, and the like) indicates a predetermined device (for example, a printer) in P2P Device Info (which can be returned from the MFP 300 when issuing a role decision processing request) of a P2P Attribute ID, the portable communication terminal apparatus 200 may determine that the communication partner apparatus should be set as a group owner.

Based on a combination of the MAC address and the category of the device, it may be determined whether the communication partner apparatus should be set as a group owner.

If it is determined that the communication partner apparatus should be set as a group owner (YES in step S1605), in step S1606 the portable communication terminal apparatus 200 decreases the value of the Owner Intent of itself to 14 or less, and issues a role decision processing request again to the communication partner apparatus. In step S1607, the portable communication terminal apparatus 200 sets itself as a client. In step S1608, the portable communication terminal apparatus 200 serves as a client, and establishes a connection with the communication partner apparatus.

On the other hand, if it is determined that the communication partner apparatus should not be set as a group owner (NO in step S1605), in step S1611 the portable communication terminal apparatus 200 determines that connection has failed, thereby terminating the process.

Processing which is executed by the MFP 300 of the third embodiment in response to the processing of FIG. 16 executed by the portable communication terminal apparatus 200 of the third embodiment will be described with reference to FIG. 17.

Figure 17:
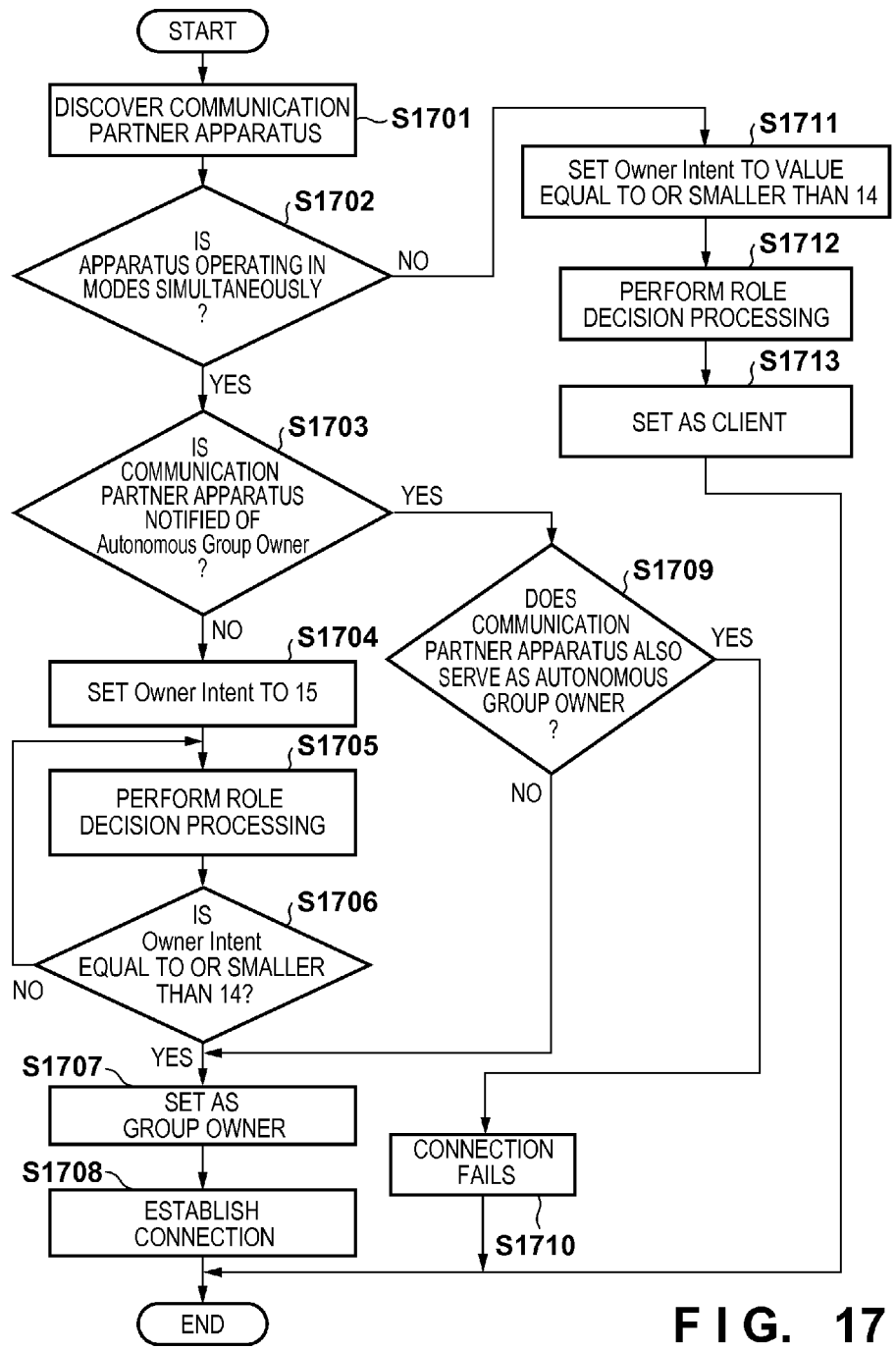
FIG. 17 is a flowchart illustrating processing executed by an MFP according to the third embodiment.

FIG. 17 is a flowchart illustrating the processing executed by the MFP 300 according to the third embodiment.

In step S1701, the MFP 300 discovers a communication partner apparatus (the portable communication terminal apparatus 200) in the P2P mode.

In step S1702, it is determined whether the MFP 300 is operating in the infrastructure mode and the P2P mode simultaneously as its communication modes. If the MFP 300 is operating in the modes simultaneously (YES in step S1702), it determines in step S1703 whether to notify the communication partner apparatus of an Autonomous Group Owner. If the communication partner apparatus is not notified of an Autonomous Group Owner (NO in step S1703), in step S1704 the MFP 300 set the Owner Intent to a maximum value of 15. In step S1705, the MFP 300 executes role decision processing.

In step S1706, the MFP 300 determines whether the Owner Intent of the communication partner apparatus is equal to or smaller than 14. If the Owner Intent of the communication partner apparatus is larger than 14 (NO in step S1706), the process returns to step S1705, and the MFP 300 performs reconnection with the communication partner apparatus until it acquires the Owner Intent equal to or smaller than 14 from the communication partner apparatus. On the other hand, If the Owner Intent of the communication partner apparatus is equal to or smaller than 14 (YES in step S1706), in step S1707 the MFP 300 sets itself as a group owner. In this case, in step S1708, the MFP 300 serves as a group owner, and establishes a connection with the communication partner apparatus.

On the other hand, if the communication partner apparatus is notified of an Autonomous Group Owner (YES in step S1703), the MFP 300 determines in step S1709 whether the communication partner apparatus also serves as an autonomous group owner. If the communication partner apparatus also serves as an autonomous group owner (YES in step S1709), in step S1710 the MFP 300 determines that connection has failed, thereby terminating the process. On the other hand, if the communication partner apparatus does not serve as an autonomous group owner (NO in step S1709), in step S1707 the MFP 300 sets itself as a group owner.

On the other hand, if the MFP 300 is not operating in the modes simultaneously (NO in step S1702), in step S1711 it sets the value of the Owner Intent to a value smaller than the maximum value, that is, a fixed value equal to or smaller than 14. In this case, in step S1712, the MFP 300 executes role decision processing. In step S1713, the MFP 300 compares its Owner Intent with that of the communication partner apparatus, and sets itself as a client/group owner based on the comparison result. In this case, in step S1713, the MFP 300 serves as a client/group owner, and establishes a connection with the communication partner apparatus. Alternatively, the MFP 300 may set an Autonomous Group Owner and forcibly establish a connection with the communication partner apparatus as a group owner.

As described above, according to the third embodiment, between devices which communicate with each other, the relationship (the values of the Owner Intents) between a group owner and a client is automatically adjusted based on the master-slave relationship (for example, a printer, digital camera, and the like of the same vendor). This makes it possible to decide the roles of a group owner and client according to a more suitable relationship.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-094641 filed Apr. 26, 2013 and 2014-037321 filed Feb. 27, 2014, which are hereby incorporated by reference herein in their entirety.

What is claimed is:

1. A communication apparatus having a wireless communication unit capable of performing a first communication mode and a second communication mode, the first communication mode and the second communication mode being in accordance with a predetermined standard, comprising: a short distance communication unit configured to perform short distance communication;
   an operating unit capable of causing the wireless communication unit to concurrently perform the first communication mode and the second communication mode; and
   a control unit configured to change a value, which is used for role decision processing to determine an apparatus operating as a role to assign a channel used for wireless connection, from a first value to a second value higher than the first value if the first communication mode and the second communication mode are concurrently performed, wherein an apparatus using higher value in the role decision processing operates as the role to assign a channel used for wireless connection, and wherein wireless connection in the first communication mode is disconnected if processing to wirelessly connect in the second communication mode with a communication partner apparatus operating as a role to assign a channel used for wireless connection is performed.

2. The apparatus according to claim 1, wherein
if the first communication mode and the second communication mode are not concurrently performed, Group Owner Negotiation using the first value is performed as the role decision processing,
if the first communication mode and the second communication mode are concurrently performed, Group Owner Negotiation using the second value is performed as the role decision processing, and
one of the communication apparatus and the communication partner apparatus that uses a higher value operates as the Group Owner.

3. The apparatus according to claim 2, wherein
the first value and the second value are intent indices indicating a strength of intent to operate as the Group Owner.

4. A control method for a communication apparatus that comprises a wireless communication unit capable of performing a first communication mode and a second communication mode, the first communication mode and the second communication mode being in accordance with a predetermined standard, the method comprising:
changing a value, which is used for role decision processing to determine an apparatus operating as a role to assign a channel used for wireless connection, from a first value to a second value higher than the first value if the first communication mode and the second communication mode are concurrently performed,
wherein an apparatus using higher value in the role decision processing operates as the role to assign a channel used for wireless connection, and
wherein wireless connection in the first communication mode is disconnected if processing to wirelessly connect in the second communication mode with a communication partner apparatus operating as a role to assign a channel used for wireless connection is performed.

5. The method according to claim 4, wherein
if the first communication mode and the second communication mode are not concurrently performed, Group Owner Negotiation using the first value is performed as the role decision processing,
if the first communication mode and the second communication mode are concurrently performed, Group Owner Negotiation using the second value is performed as the role decision processing, and
one of the communication apparatus and the communication partner apparatus that uses a higher value operates as the Group Owner.

6. The method according to claim 5, wherein
the first value and the second value are intent indices indicating a strength of intent to operate as the Group Owner.

7. The apparatus according to claim 1, wherein the short distance communication unit is a Near Field Communication (NFC) unit.

8. The apparatus according to claim 1, wherein the short distance communication unit is a Bluetooth unit.

9. The apparatus according to claim 1, wherein
the first communication mode is an infrastructure mode compliant with IEEE 802.11 standard, and
the second communication mode is a Wi-Fi Direct mode in which an external access point is not used.

10. The apparatus according to claim 1, further comprising a print unit.

11. The apparatus according to claim 10, further comprising a plurality of paper feed units.

12. The method according to claim 4, wherein
the communication apparatus comprises a Near Field Communication (NFC) unit.

13. The method according to claim 4, wherein
the communication apparatus comprises a Bluetooth unit.

14. The method according to claim 4, wherein
the communication apparatus comprises a print unit.

15. The method according to claim 4, wherein
the communication apparatus comprises a plurality of paper feed units.

16. A control method for a printing apparatus having a wireless connection unit capable of concurrently performing a first communication mode and a second communication mode, the first communication mode and the second communication mode being in accordance with a predetermined standard, comprising:
conveying a sheet;
printing an image on the conveyed sheet; and
causing the wireless connection unit to concurrently perform the first communication mode and the second communication mode,
wherein wireless connection in the first communication mode is disconnected if processing to wirelessly connect in the second communication mode with a communication partner apparatus operating as a role to assign a channel used for wireless connection is performed.

17. The method according to claim 16, wherein
if the first communication mode and the second communication mode are not concurrently performed, Group Owner Negotiation using a first value is performed as role decision processing, and
if the first communication mode and the second communication mode are concurrently performed, Group Owner Negotiation using a second value higher than the first value is performed as the role decision processing.

18. The method according to claim 17, wherein
the first value and the second value are intent indices indicating a strength of intent to operate as the Group Owner.

19. The method according to claim 16, wherein
the printing apparatus comprises a Near Field Communication (NFC) unit as a short distance communication unit.

20. The method according to claim 16, wherein
the printing apparatus comprises a Bluetooth unit as a short distance communication unit.

21. The method according to claim 16, wherein
the first communication mode is an infrastructure mode compliant with IEEE 802.11 standard, and
the second communication mode is a Wi-Fi Direct mode in which an external access point is not used.

* * * * *